Nov. 15, 1960 M. PITTA 2,960,292
SAFETY ENCLOSURE FOR AIRCRAFT PASSENGERS
Filed March 16, 1959
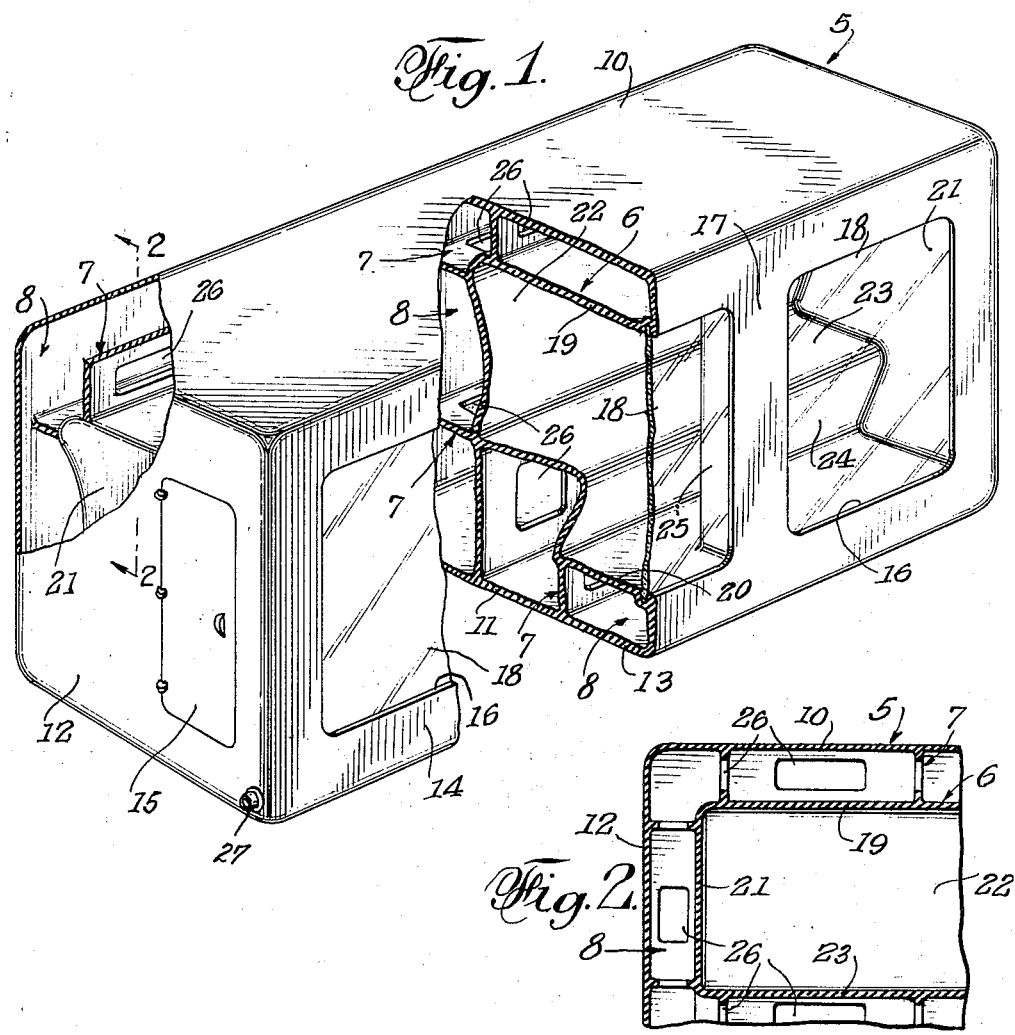
INVENTOR.
MANUEL PITTA
BY C. G. Stratton
ATTORNEY

United States Patent Office 2,960,292
Patented Nov. 15, 1960

2,960,292

SAFETY ENCLOSURE FOR AIRCRAFT PASSENGERS

Manuel Pitta, 1038 N. Martel Ave., Los Angeles 26, Calif.

Filed Mar. 16, 1959, Ser. No. 799,581

2 Claims. (Cl. 244—118)

This invention relates to an enclosure for passengers of aircraft and which contributes to their safety under conditions of shock, as during accidents and too rapid acceleration or deceleration.

An object of the present invention is to provide novel simple and improved means to surround the passengers with an air cushioned enclosure to obviate physical damage ordinarily caused during crush conditions.

Another object of the invention is to provide a safety enclosure that is inflatable for easy installation in aircraft and, before inflation, may be compactly folded for ready storage, handling and transportation.

A further object of the invention is to provide an enclosure of the character referred to that, because it is formed of air-impervious flexible but not unduly stretchable material, firmly retains the inflated form thereof.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a perspective view, partly broken away, of a safety enclosure for aircraft according to the present invention.

Fig. 2 is a fragmentary vertical sectional view as taken on the line 2—2 of Fig. 1.

The present enclosure is advantageously made of rubberized fabric, rubber impregnated fabric, fabric impregnated with pliable plastic material or, for that matter, any air impervious plastic. The fabric minimizes stretch. Accordingly, if the material used is of limited stretchability, the fabric may be omitted and a suitable plastic of similar strong properties may be used. It is desired that the material used be foldable without cracking, thin for easy folding, and lightweight for facile handling.

The enclosure that is illustrated integrally comprises an outer shell 5, an inner seat shell 6, and a plurality of shell-connecting webs 7 extending across the cushioning space 8 between the shells and occupied by compressed air when the enclosure is in operative condition.

The outer shell 5 comprises a top 10, a bottom 11, end walls 12, a bottom wall 13, and a front wall 14. All of said walls, except the front wall and one of the end walls, may be full unbroken walls. The said end wall may have an access door 15 therein, and the front wall may have openings 16 that define column-like intermediate portions 17, thereby dividing the latter wall into a plurality of windows. The particular design or shape of the windows may be varied providing said front wall 14 has a form-retaining configuration that contributes to the shape of the outer shell when the enclosure is inflated. The window openings 16 of said front wall may be closed by transparent pliable and foldable panels 18 that are preferably cemented in place, the same being of the general soft consistency of the above-described material used for the enclosure walls.

The inner seat shell 6 comprises a ceiling 19, a floor 20, end walls 21, a seat back 22, a seat 23, and a riser wall 24 connecting the seat 23 and the floor 20. The ceiling 19 and the floor 20 join the front wall 14 of the outer shell 5 and all the other inner walls are spaced from the outer shell by the mentioned space 8.

As shown in Fig. 1, the portion 17 of the outer shell may comprise the outer wall of front wall portions 25 provided on the inner shell, the column thus formed being occupied by compressed air and constituting a cushioning member. According to the length of the enclosure, one or more such front columns may be incorporated in the structure.

It will be understood that the form of the seat portion of the inner shell may be designed in various ways to accommodate passengers in seating, reclining or lying positions, as desired, and the enclosure may be varied in form accordingly. Also, cushioning protection of the front wall may be increased by materially reducing the size of the window openings 16 and providing air spaces, such as in the front column 17, 25 between the inner and outer shell as the front.

The webs 7 may be provided wherever the same are required to hold the form of the inner shell or locate the same relative to the outer shell. Such webs may be provided with suitable openings 26 so that air introduced through a self-closing valve 27 will inflate all portions of the enclosure and completely fill the inner space 8 thereof to such a pressure that the inner shell will comfortably accommodate passengers.

While folded, the present enclosure may be put in place in an aircraft and then inflated either from an outside source of air or gas or from a cartridge or cartridges at one or more valved inlets 27 provided.

It will be evident that the occupants of the present enclosure are in positions of safety and protected by the cushioning surroundings afforded by the air-filled enclosure.

It will be evident that because the present enclosure is air-filled, the same will be highly buoyant, thereby increasing the safety features of the device.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claims.

Having thus described my invention, what is claimed and desired to be secured by Letters Patent is:

1. A safety enclosure comprising a generally elongated rectangular outer shell of thin, pliable, and air-impervious material, said shell, thereby, having six walls, one wall having a door-closed access opening, a second and elongated wall having at least two rectangular openings therein, thin, transparent and flexible panels closing said rectangular openings and constituting transparent portions of the latter wall, a generally elongated rectangular inner shell of thin, pliable and air-impervious material having walls spaced from the outer shell and provided with webs that extend into integral connection with the walls of the outer shell, the entire interior of the inner shell being enclosed between the walls thereof and the transparent panels of the outer shell, two adjacent elongated walls of the inner shell being formed to constitute an elongated seat that faces said transparent panels, the mentioned webs having openings therein whereby compressed air introduced into the space between the shells circulates throughout said space to distend the outer shell outwardly and the inner shell into passenger-accommodating form.

2. A safety enclosure according to claim 1 in which the webs connecting any two walls of the two enclosures extend in mutually transverse directions to form longitudinal and transverse supports for the inner enclosure walls.

References Cited in the file of this patent

UNITED STATES PATENTS

| 1,027,764 | Rilleau | May 28, 1912 |
| 2,418,798 | Whitmer | Apr. 8, 1947 |
| 2,886,265 | Ritter et al. | May 12, 1959 |

FOREIGN PATENTS

| 797,711 | Great Britain | July 9, 1956 |